March 1, 1932.   H. H. HICKS   1,847,962

HOOD ANTISQUEAK DEVICE

Filed Sept. 6, 1927

Inventor
Harlie H. Hicks

By Blackmore, Spencer & Flint
Attorneys

Patented Mar. 1, 1932

1,847,962

UNITED STATES PATENT OFFICE

HARLIE H. HICKS, OF DETROIT, MICHIGAN, ASSIGNOR TO GENERAL MOTORS CORPORATION, OF DETROIT, MICHIGAN, A CORPORATION OF DELAWARE

HOOD ANTISQUEAK DEVICE

Application filed September 6, 1927. Serial No. 217,682.

This invention relates to hood anti-squeak devices, and it is an object of the invention to provide an anti-squeak device which is efficient in operation, simple in construction, and which may be quickly and cheaply installed.

Wherever two metal surfaces overlap or come together and there is relative movement between the two, squeaking and wear result. It is an object of this invention to provide a device which will prevent such squeaking and wear.

If a piece of suitable non-metallic material is arranged between the two surfaces the wear of the two surfaces, and the squeaking resulting from movement of one over the other will be eliminated. Obviously, the non-metallic material should be secured to one of the two surfaces and, in view of the considerable movement between the two surfaces, the heat and the oil and grease to which a strip positioned between the hood and cowl of an automobile is likely to be subjected, rivets, bolts or the like are the most satisfactory securing means. If an ordinary flat strip of non-metallic material is secured to the cowl or cowl moulding in the ordinary manner, the heads of the bolts, rivets, or the like will, as soon as the non-metallic material is compressed or worn down to a slight extent, rub against the hood and produce the objectionable squeak and wear. This may be overcome, of course, by using a strip with beaded edges, putting the securing means through the channel between the rivets. But such a strip is comparatively expensive and, as ordinarily formed, the beads are small and soon wear down and the hood rests on the heads of the securing means. It is an object of this invention to provide an anti-squeak strip and securing means therefor which obviate the difficulties discussed above, which is cheaper than the beaded strip, and in which there is a comparatively large surface of contact between the strip and the hood.

Another object of this invention is to provide a strip of anti-squeak material of such section and mounted in such a manner on the cowl of an automobile as to prevent the hood from coming into contact with the rivets or the like which secure the strip to the cowl.

Figures 1, 2, 3, 4, 5:
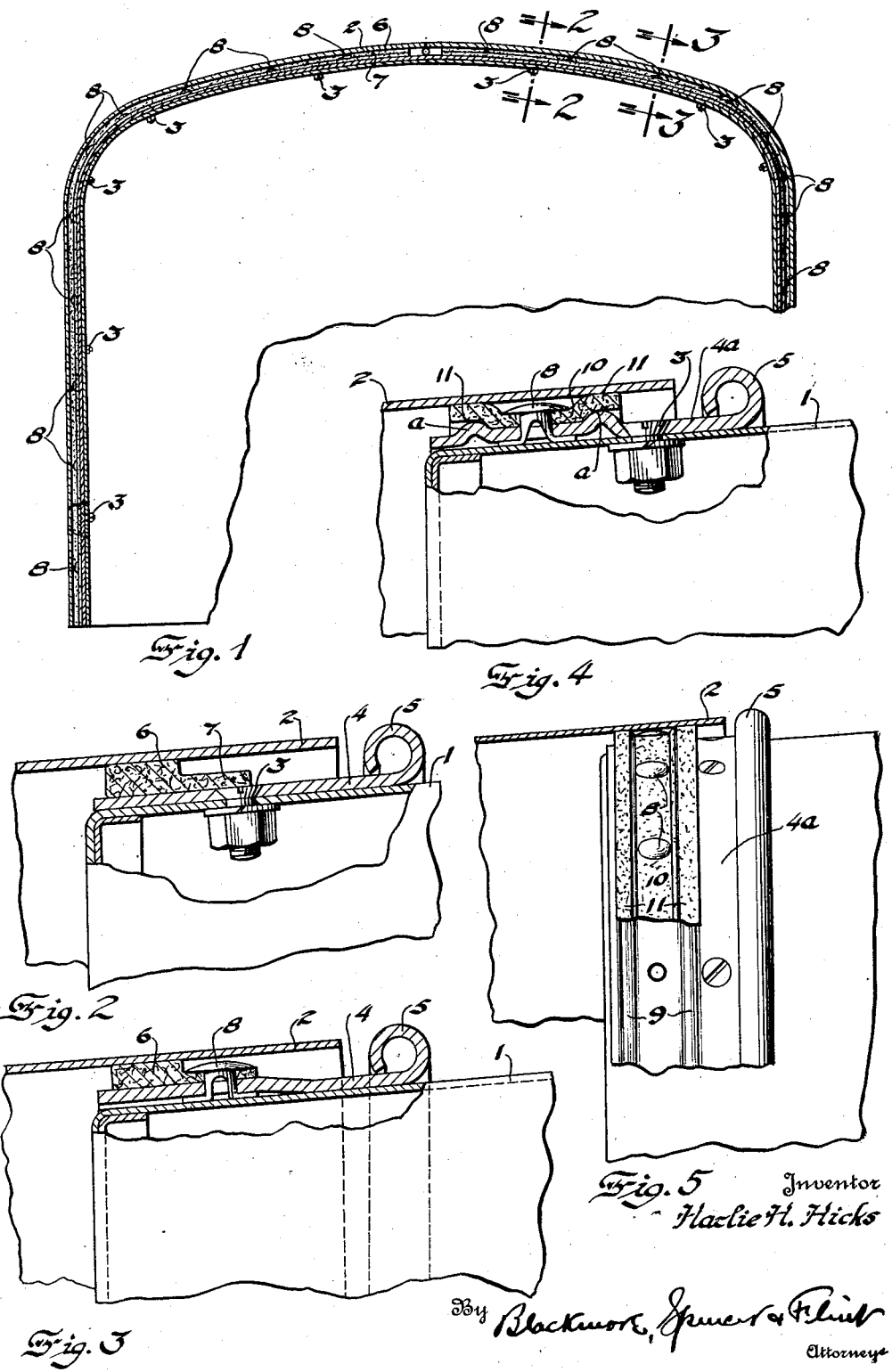
Figure 1 is a transverse cross section taken through the hood and the cowl of an automotive vehicle in which is embodied my invention.
Figure 2 is a cross section taken on the line 2—2 of Figure 1.
Figure 3 is a cross section taken on the line 3—3 of Figure 1.
Figure 4 is a cross section, similar to Figures 2 and 3 showing a modified form of anti-squeak device.
Figure 5 is a fragmentary side elevation of the construction shown in Figure 4, a portion of the hood being removed in order to show the construction of the anti-squeak device more clearly.

In the drawings, referring at present to Figures 1–3, 1 represents the cowl of an automobile and 2 the hood thereof. Secured to the cowl by bolts or the like 3 is a moulding 4 on the rear edge of which is provided a bead 5.

The anti-squeak strip is, as shown in Figures 2 and 3 made of a non-metallic material, homogeneous throughout, preferably resilient, and is so shaped as to present a raised portion 6 and a stepped-down portion 7.

The strip is secured to the moulding 4 by means of rivets 8 passing through the stepped-down portion 7 and through the moulding 4. It is to be noted that the height of the stepped-down portion 7 plus the thickness of the head of the rivet 8 is considerably less than the height of the raised portion 6 so that when the hood is in closed position (as shown in Figures 2 and 3) it rests on the broad flat surface of the raised portion 7 and is spaced a considerable distance from the rivet heads.

As shown in Figure 1, the securing means 3, by means of which the moulding is secured to the cowl, are spaced longitudinally from the means 8 which secure the anti-squeak strip to the moulding. At the points at which the strip is secured to the moulding the moulding is, as may be seen in Figure 3, formed with a slight indentation on its inner side extending from its unbeaded edge inwardly to accommodate the head or prongs of the securing means. Since the rivets 8 do not pass through the cowl the strip and moulding may be fastened on or removed from the cowl as a unit.

Referring to the modification shown in Figures 4 and 5, there is shown a moulding 4a secured to the cowl 1 by means such as bolts 3. The moulding is formed with two transversely spaced longitudinally extending ridges 9 with a depression between them.

The reference character 10 denotes a strip of anti-squeak material. Before this strip is applied to the moulding it is of substantially rectangular cross section. It is placed on the moulding and its central portion drawn down into the depression between the beads by means of the securing means 8. This leaves the two raised portions 11, upon which the hood rests, considerably above the heads of the securing means 8. It is to be noted that the surface of contact between the raised portions 11 and the hood is much larger than that between a beaded strip and the hood. Thus the effect and good qualities of a beaded strip without its attendant expense have been obtained by applying a flat strip of anti-squeak material to the moulding shown in Figures 4 and 5.

It is obvious that the use of my anti-squeak strip is not limited to the cowls of automobiles but may be used between the hood and radiator or between any two contacting surfaces.

Furthermore the anti-squeak strip may be fastened directly to the cowl if it is not desired to use a moulding. If the moulding is eliminated from the structure of Figures 4 and 5 the ridges 9 will, of course, be formed in the cowl.

If desired the structure of Figures 4 and 5 may be modified by eliminating one of the ridges 9 without departing from the spirit of the invention.

I claim:

1. In an automotive vehicle, a member from which one end of the engine hood is adapted to be supported and on which there are provided relatively raised and depressed portions which extend transversely of the vehicle, a flexible non-metallic strip extending transversely of the vehicle and so arranged that laterally spaced portions thereof rest respectively on the relatively raised and depressed portions of the member, and means extending through the portion of the strip which rests on the relatively depressed portion of the member and into the member so as to draw the last mentioned portion of the strip down below the level of the portion thereof which rests on the raised portion of the member, and to provide on the strip a relatively raised portion on which the end of the engine hood is adapted to rest.

2. In an automotive vehicle, a member from which one end of the engine hood is adapted to be supported and on which there are provided relatively raised portions separated by a relatively depressed portion which extends transversely of the vehicle, a flexible non-metallic strip extending transversely of the vehicle and so arranged that one longitudinal edge thereof rests on each of the relatively raised portions of the member, and means extending through the intermediate portion of the strip and into the relatively depressed portion of the member so as to draw the intermediate portion of the strip down below the level of the portions thereof which rest on the raised portions of the member, and to provide relatively raised portions on which the end of the hood is adapted to rest.

3. In an automotive vehicle, a member from which one end of the engine hood is adapted to be supported, a moulding on which there are provided two spaced ridges extending transversely of the vehicle and secured to the member, a flexible non-metallic strip extending transversely of the vehicle and so arranged that one longitudinal edge thereof rests upon each of the ridges on the moulding, and means extending through the intermediate portion of the strip and into the moulding so as to draw the intermediate portion thereof down below the level of the portion which rests on the ridges, and to provide relatively raised portions on which the end of the hood is adapted to rest.

In testimony whereof I affix my signature.

HARLIE H. HICKS.